Oct. 14, 1941.    G. A. SPOHN    2,259,357
MOTOR CONTROL SYSTEM
Filed April 25, 1940
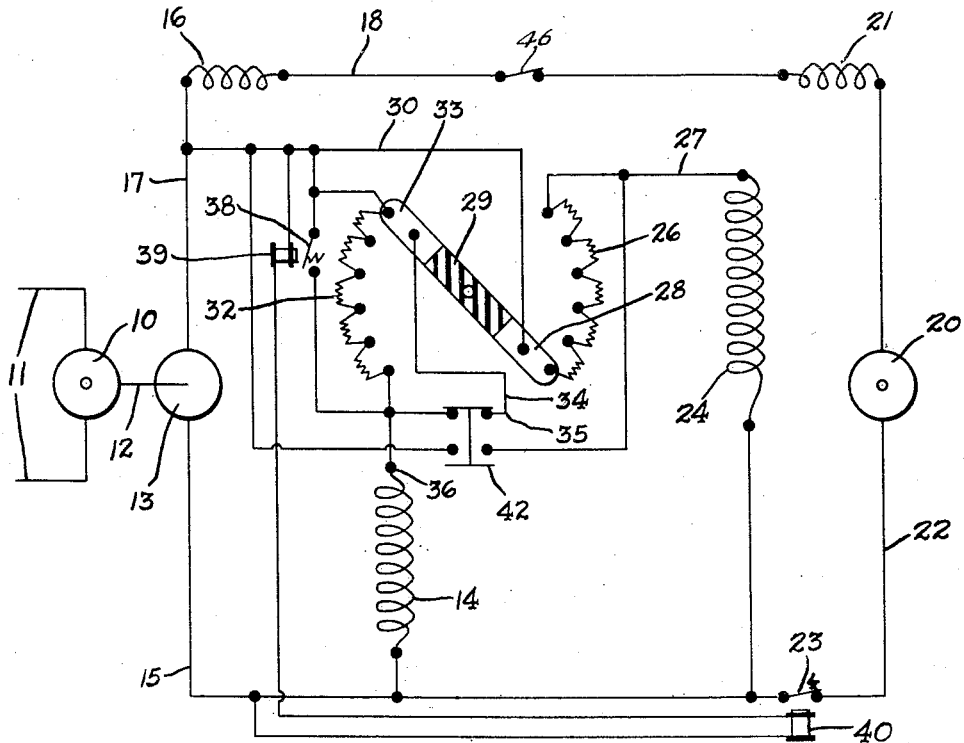
Inventor
Glenn A. Spohn
by Marechal & Noe
Attorneys Patented Oct. 14, 1941

2,259,357

UNITED STATES PATENT OFFICE 2,259,357

MOTOR CONTROL SYSTEM

Glenn A. Spohn, Mount Healthy, Ohio

Application April 25, 1940, Serial No. 331,619

11 Claims. (Cl. 172—239)

This invention relates to variable speed driving devices in which an electric motor is operated at different speeds by an electric generator.

One object of the invention is the provision of a variable speed drive device including a power driven electric generator having a self-excited or shunt field winding and having provision for varying the generated voltage, and an electric motor operated from the generator and having a shunt field winding with control means therefor to regulate its impressed voltage so that the speed of operation of the motor can be varied.

Another object of the invention is the provision of a variable speed drive device including a power operated generator having a self-excited or shunt field winding and operating an electric motor having a shunt field winding connected to its armature, there being provision for simultaneously changing the output voltage of the generator while maintaining a substantially constant voltage across the shunt field winding of the motor to provide varying speeds of motor operation.

Another object of the invention is the provision of a self-contained motor generator set operated by an alternating current motor and provided with shunt field windings connected across the armatures of the motor and the generator and having readily controllable means for simultaneously changing the output voltage of the generator while maintaining a substantially constant current in the shunt field of the motor to provide widely varying speeds of operation of the motor.

Other objects and advantages of the invention will be apparent from the following description, the appended claims and the accompanying drawing.

The drawing is a diagrammatic showing of a motor generator set embodying the present invention.

Referring more particularly to the drawing, in which the preferred embodiment of the invention has been shown, the numeral 10 designates an electric power drive means such as an alternating current motor adapted for connection through wires 11 to a suitable alternating current source. The shaft of the motor 10 is connected mechanically to the armature of a direct current generator 13 having a self-excited or shunt field winding 14 connected to one side of the generator armature by the wire 15. The generator may, if desired, have a small series field winding 16 connected to the wire 17 and connected to the output or supply wire 18.

The output voltage of the direct current generator is impressed, through the wires 15 and 18 across the armature of a direct current motor 20 which may, if desired, have a small series field winding 21 connected to one side of the motor armature. The other side of the motor armature is connected through the wire 22 and through a switch 23 which is closed during operation, to the supply wire 15 and to the shunt field winding 24 of the motor.

The motor 20 is provided with means, associated with its shunt field winding, for controlling the voltage across such winding, and the shunt field winding of the generator has associated with it controllable means by which the generated voltage can be readily changed. Thus the motor will be driven at any desired speed, the construction being such as to eliminate the use of a separate generator for exciting purposes such as is ordinarily used in connection with a variable speed motor generator set to provide control for the motor speed. In accordance with the preferred embodiment of the invention illustrated, a resistance 26 is connected in series with the motor shunt field winding 24 by wire 27, the resistance being contacted by the contact blade 28 of a rotatable arm 29 which may be moved by the operator to cut any desired part of the resistance 26 into or out of circuit with the shunt field winding of the motor. The blade 28 is connected electrically by a wire 30 to the wire 17 so that the generated voltage across the generator armature will be impressed across the circuit including the resistance 26 and the field winding 24 of the motor. In the operating position shown in the drawing, corresponding to the maximum speed of operation, the entire resistance 26 is in series with the shunt field winding.

Connected in series with the shunt field winding 14 of the generator is a resistance 32 contacted by a second blade 33 of arm 29. The blade 33 is electrically connected by wire 34, through a switch 35 which is normally closed during operating conditions, to the wire 36 connected to one end of the shunt field winding 14 so that as the arm 29 is turned and the blade 33 contacted with different portions of the resistance 32, more or less of that resistance may be cut into or out of circuit with the shunt field winding 14 and thus change the voltage output of the generator.

The arm 29 thus forms a common control means for simultaneously increasing the resistance in series with the shunt field winding 14 and decreasing the resistance in series with the shunt field winding 24, or vice versa, it being apparent that by increasing the resistance in series with the generator shunt field winding the output voltage of the generator will be decreased without however causing a corresponding decrease in the voltage impressed across the motor winding 24. The voltage across the winding 24 may be kept substantially constant as the generator voltage changes. It is preferred that the steps between the several contact points along the resistance 26 be so coordinated with the steps of the resistance 32 as to maintain a substantially constant current flow through the shunt field winding 24, and provide substantially constant motor torque. Assume for example that the output voltage of the generator impressed across the direct current supply wires 15 and 18 is 230 volts when the resistance 32 is entirely short circuited under operating conditions, and 115 volts is impressed across winding 24 with resistance 26 entirely in series with the winding 24. This may give an operating speed of 1700 R. P. M. for motor 20. The resistances 32 and 26 are so interrelated that the voltage impressed across the motor field winding 24 will remain substantially constant at about 115 volts as the resistance 26 is changed, and when the resistance 26 is entirely out of circuit, and the shunt field winding 24 is connected directly to the full generator voltage, a motor speed of about 850 R. P. M. will result, as the generator voltage will now be reduced to 115 volts.

The arm 29 may be moved to any desired position between its limits of travel to preset the speed of operation of the motor before the device is started. To provide improved temporary starting conditions, a voltage responsive switch 38 is connected across the resistance 32 to short circuit that resistance and keep it short circuited until a sufficient voltage is built up by the generator. The switch 38 is normally yieldingly urged to closed position. The voltage build-up takes place more rapidly with the full armature voltage across the shunt field of the generator, and as soon as some predetermined generated voltage is obtained, a coil 39 is energized to such extent as to open the switch 38 which it controls, and hold it open during continued operating conditions. This coil 39 is connected to a second coil 40 which closes the switch 23 as soon as the predetermined generated voltage is obtained, switch 23 being normally open when the device is not operating but being held closed by the energized coil 40 during operating conditions.

Under starting conditions the shunt field winding 24 of the motor is temporarily connected directly across the generator armature, to receive the full voltage of the generator, by a switch 42 which is closed during starting conditions and which short circuits the resistance 26 so that the motor can be readily started under torque and first operated at a low speed even if the arm 29 should be set for high speed operation. The switch 42 is preferably mechanically connected to the switch 35 which temporarily cuts the full resistance 32 in series with the generator field winding 14 to provide for low speed operation. As soon as the device has been started by connecting the driving motor 10 to the power source, and after the voltage responsive switches 23 and 38 have been automatically closed and opened respectively, the direct current motor and the generator will be temporarily set for slow speed operation regardless of the position of the arm 29. The switch 35 is then closed and switch 42 opened by the operator, and the motor 20 will then operate at a speed determined by the setting of the arm 29 until the motor is disconnected from the generator by the manually operable switch 46. The arm 29, when adjusted, simultaneously changes the resistances 26 and 32 inversely and gives any desired motor speed within wide limits of speed adjustment. From the preceding discussion, it is apparent that the starting order is as follows: The attendant operates switches 35 and 42, opening switch 35 and closing switch 42, and then connects motor 10 to the source of supply 11. The generator begins to build up voltage, and regardless of the position of the arm 29, the starting conditions and connections will be the same, the switch 38 being automatically held closed and the switch 23 being automatically held opened so that the resistance 32 is shunted at the time the generator starts. The generator then begins to build up voltage which effects a closing of the switch 23 and the opening of the switch 38, and the speed of operation of the motor is then adjusted by moving the arm 29.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A variable speed drive device comprising power means, a self-excited electric generator operated by said power means and having a shunt field winding, means for varying the output voltage of the generator, an electric motor disposed to be connected across the generator and having a field winding, variable means connected to the field winding of the motor operable to increase the resistance of the field winding circuit of the motor in accordance with the voltage increase in the generator output, switching means in the circuit for connecting the motor to the generator normally biased to open circuit position, a second switching means biased to closed circuit position for shunting the means for varying the output voltage of the generator, and means responsive to the rise in generator voltage during starting of the generator for operating said first and said second switching means.

2. A variable speed drive device comprising power means, an electric generator operated by said power means and having a shunt field winding, a variable resistance in series with the shunt field winding for varying the output voltage of the generator, control means for varying said resistance, an electric motor disposed to be connected across the generator and having a field winding, a second control means operably connected with the first control means and connected to the field winding of the motor for maintaining a substantially constant motor field current as the output voltage of the generator is varied, switching means biased to open circuit position and automatically operable to electrically connect the motor to the generator, a second switching means biased to closed circuit position for shunting said variable resistance, means responsive to a predetermined rise in generator voltage during starting of said generator, for operating said first switching means to closed circuit position, and means responsive to a predetermined rise in generator voltage during starting of said generator, for operating said second switching means to open circuit position.

3. A variable speed drive device comprising power means, an electric generator operated by said power means and having a shunt field winding, a variable resistance in series with the shunt field winding for varying the output voltage of the generator, an electric motor disposed to be connected across the generator and having a field winding, a variable resistance connected in series with the field winding of the motor, and means operable to increase the resistance in series with the field winding of the motor while simultaneously decreasing the resistance in series with the shunt field winding of the generator to vary the speed of operation of the motor, means for shunting said generator field resistance during starting of the generator, means for shunting said motor field resistance during starting of said motor, means for connecting the motor to the generator, means responsive to a given rise in voltage of the generator during starting for operating said means for connecting said motor to said generator, and means responsive to a given rise in generator voltage during starting for automatically removing the shunting circuit for said generator field resistance.

4. A variable speed drive device comprising alternating current power means, a direct current self-excited electric generator mechanically operated by said power means and having a shunt field winding, a variable control means connected to the shunt field winding for varying the output voltage of the generator, an electric motor disposed to be connected across the generator output and having a field winding electrically connected to the motor armature, a variable resistance in series with the field winding of the motor, common means operable to increase the resistance in series with the motor field winding while operating the variable control means of the generator to increase the generator voltage, means responsive to a predetermined rise in generator voltage for connecting the motor to the generator, means responsive to a predetermined rise in generator voltage for temporarily making said variable control means ineffective during starting, and means for shunting the said variable resistance during starting of the motor.

5. A variable speed drive device comprising alternating current power means, a direct current electric generator mechanically operated by said power means and having a shunt field winding, a variable resistance in series with the shunt field winding for varying the output voltage of the generator, a shunting circuit for said variable resistance, means responsive to a predetermined generator voltage during starting of the generator for opening said shunting circuit, an electric motor disposed to be connected across the generator output and having a field winding connected to the motor armature, a variable resistance in series with the field winding of the motor, manually operable means for shunting said variable resistance for the motor field winding during starting of the motor, means responsive to a predetermined generator voltage during starting of the generator for connecting the motor to the generator, common means operable to increase the resistance in series with the motor field winding by predetermined steps while decreasing the resistance in series with the generator shunt field winding, the steps in the motor field winding resistance being so coordinated with the steps in the generator field winding resistance as to maintain the voltage across the motor field winding substantially constant.

6. A variable speed drive device comprising alternating current power means, a direct current electric generator mechanically operated by said power means and having a shunt field winding, a variable control means connected to the shunt field winding for varying the output voltage of the generator, an electric motor connected across the generator output and having a field winding electrically connected to the motor armature, a variable resistance in series with the field winding of the motor, and common means operable to increase the resistance in series with the motor field winding while operating the variable control means of the generator to increase the generated voltage and thus vary the speed of operation of the motor, and voltage responsive means operative during starting until predetermined generator voltage is obtained to connect the full armature voltage of the generator across the generator shunt field winding.

7. A variable speed drive device comprising alternating current power means, a direct current electric generator mechanically operated by said power means and having a shunt field winding, a variable control means connected to the shunt field winding for varying the output voltage of the generator, an electric motor disposed to be connected across the generator output and having a field winding electrically connected to the motor armature, a variable resistance in series with the field winding of the motor, and common means operable to increase the resistance in series with the motor field winding while operating the variable control means of the generator to increase the generated voltage and thus vary the speed of operation of the motor, voltage responsive means operative when a predetermined generator voltage is obtained to connect the motor to the generator, and voltage responsive means operative until a predetermined generator voltage is obtained to connect the full armature voltage of the generator across the generator shunt field winding regardless of the position of adjustment of the said common means.

8. A variable speed drive device comprising alternating current power means, a direct current electric generator mechanically operated by said power means and having a shunt field winding, a variable control means connected to the shunt field winding for varying the output voltage of the generator, an electric motor disposed to be connected across the generator output and having a field winding electrically connected to the motor armature, a variable resistance in series with the field winding of the motor, and common means operable to increase the resistance in series with the motor field winding while operating the variable control means of the generator to increase the generated voltage and thus vary the speed of operation of the motor, voltage responsive means operative when a predetermined generator voltage is obtained to connect the motor to the generator, voltage responsive means operative until a predetermined generator voltage is obtained to connect the full armature voltage of the generator across the generator shunt field winding, and manually operable means for subjecting the motor field to the full generator voltage during starting.

9. A variable speed drive device comprising alternating current power means, a direct current electric generator mechanically operated by said power means and having a shunt field winding, a variable control means connected to the shunt field winding for varying the output voltage of the generator, an electric motor connected across the generator output and having a field winding electrically connected to the motor armature, a variable resistance in series with the field winding of the motor, and common means operable to increase the resistance in series with the motor field winding while operating the variable control means of the generator to increase the generated voltage and maintain a constant current in the motor field winding, thus varying the speed of operation of the motor, and voltage responsive means shunting the variable control means of the generator during starting and operative when a predetermined generator voltage is obtained to connect the motor armature in circuit with the generator and remove the shunt of the variable control means of the generator.

10. A variable speed drive comprising, in combination, a source of supply of electrical energy; a constant speed motor disposed to be connected to said source of supply to thus be operated; a direct-current generator mechanically coupled to the motor to be thus started and brought up to full speed upon connection of said motor to said source of supply, said generator having a field winding having one terminal connected to one of the armature terminals of the generator and its other terminal connected to generator field control means, said generator field control means comprising a resistor, a circuit including a switch normally closed during starting for shunting the entire resistor, an adjustable rheostat arm for shunting any portion of the resistor; a motor, said motor having a field winding having one terminal connected to one of the generator armature terminals and its other terminal connected to motor field control means, said motor field control means comprising a resistor, a circuit including a switch open during normal operation but when closed shunting the entire last named resistor, an adjustable rheostat arm for the resistor for shunting any portion of said last named resistor; said rheostat arms being connected so that as more and more resistor sections of the resistor for the generator field are connected fewer and fewer resistor sections of the resistor for the motor field are connected, the resistor sections of the resistors being so related that constant current is maintained in the motor field with changes in generator voltage by reason of the shifting of the said rheostat arms.

11. A variable speed drive, in combination, a variable speed motor having an armature winding and a field winding, a generator having an armature winding and a field winding, a pair of rheostats one for each field winding, means for selectively connecting the motor field winding either directly to the generator armature winding or through any selected portion of one of the rheostats, means for selectively connecting the generator field winding either directly to the generator armature winding or through any selected portion of the other of said rheostats, and means responsive to the generator voltage for connecting the motor armature to the generator armature after starting the generator and for eliminating the direct connection of the generator field winding to the generator armature.

GLENN A. SPOHN.